United States Patent
Fan et al.

(10) Patent No.: US 9,934,186 B2
(45) Date of Patent: Apr. 3, 2018

(54) INTELLIGENT CONNECTOR AND BUS CONTROLLER

(71) Applicant: Tyco Electronics (Shanghai) Co., Ltd., Shanghai (CN)

(72) Inventors: Mingjie Fan, Shanghai (CN); Yuming Song, Shanghai (CN); Junying Liu, Shanghai (CN); Yulin Feng, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 378 days.

(21) Appl. No.: 14/598,757

(22) Filed: Jan. 16, 2015

(65) Prior Publication Data
US 2015/0127862 A1    May 7, 2015

Related U.S. Application Data

(63) Continuation of application No. PCT/EP2013/064887, filed on Jul. 15, 2013.

(30) Foreign Application Priority Data

Jul. 16, 2012 (CN) .......................... 2012 1 0246232

(51) Int. Cl.
*G06F 13/42* (2006.01)
*G06F 13/40* (2006.01)
(Continued)

(52) U.S. Cl.
CPC .......... *G06F 13/4068* (2013.01); *G06F 1/266* (2013.01); *G06F 1/3203* (2013.01);
(Continued)

(58) Field of Classification Search
CPC .... G06F 13/4068; G06F 1/266; G06F 1/3203; G06F 13/287; G06F 13/364; G06F 13/4022; H04B 3/542
(Continued)

(56) References Cited

U.S. PATENT DOCUMENTS 2,449,148 A * 9/1948 Sands ...................... H03D 7/18
                                                                333/179
4,057,793 A * 11/1977 Johnson .............. H02J 13/0031
                                                                307/126
(Continued)

FOREIGN PATENT DOCUMENTS

DE    102006030706 A1    1/2008
EP         2293413 A2    3/2011

OTHER PUBLICATIONS

Definition Transparent Bridging Feb. 11, 2010, Wifipedia free encyclopedia.*
(Continued)

*Primary Examiner* — Paul R Myers
(74) *Attorney, Agent, or Firm* — Barley Snyder

(57) ABSTRACT

An intelligent connector is disclosed having a signal processing unit, a first port, and a second port. The signal processing unit communicates signals between a bus and a slave module. The first port is coupled between the bus and the signal processing unit, and is connected to a power supply line. The second port is coupled between the signal processing unit and the slave module, and is positioned to provide a power supply to the slave module.

22 Claims, 5 Drawing Sheets

(51) Int. Cl.
*H04B 3/54* (2006.01)
*G06F 1/32* (2006.01)
*G06F 13/28* (2006.01)
*G06F 13/364* (2006.01)
*G06F 1/26* (2006.01)

(52) U.S. Cl.
CPC .......... *G06F 13/287* (2013.01); *G06F 13/364* (2013.01); *G06F 13/4022* (2013.01); *H04B 3/542* (2013.01); *H04B 2203/5416* (2013.01); *H04B 2203/5483* (2013.01)

(58) Field of Classification Search
USPC ........................................................ 710/110
See application file for complete search history.

(56) References Cited

U.S. PATENT DOCUMENTS

| | | | | | |
|---|---|---|---|---|---|
| 4,245,301 | A | * | 1/1981 | Rokutanda | G06F 13/362 710/107 |
| 5,343,471 | A | * | 8/1994 | Cassagnol | H04L 45/7453 370/401 |
| 5,559,377 | A | * | 9/1996 | Abraham | H04B 3/56 307/104 |
| 5,570,366 | A | * | 10/1996 | Baker | H04J 3/02 370/312 |
| 5,608,726 | A | * | 3/1997 | Virgile | H04L 12/1886 370/401 |
| 5,790,806 | A | * | 8/1998 | Koperda | H04L 12/2801 348/E7.071 |
| 6,326,744 | B1 | * | 12/2001 | Lee | H04N 3/26 315/382 |
| 6,903,910 | B1 | * | 6/2005 | Griesing | G01R 29/0821 361/142 |
| 7,058,826 | B2 | * | 6/2006 | Fung | G06F 1/3203 709/200 |
| 7,249,191 | B1 | * | 7/2007 | Hutchison | H04L 29/12028 709/236 |
| 7,418,683 | B1 | * | 8/2008 | Sonnard | G06F 17/5081 716/122 |
| 7,445,507 | B1 | * | 11/2008 | Parker | H01R 13/665 439/620.18 |
| 7,872,378 | B2 | * | 1/2011 | Lo | H04L 12/10 307/1 |
| 8,301,832 | B1 | * | 10/2012 | Moore | G06F 3/061 711/103 |
| 8,509,097 | B1 | * | 8/2013 | Gourlay | H04L 43/04 370/251 |
| 8,704,399 | B2 | | 4/2014 | Tajima | |
| 8,787,209 | B2 | | 7/2014 | Halsall | |
| 2005/0273211 | A1 | * | 12/2005 | McGarry | G08C 17/02 701/1 |
| 2006/0015505 | A1 | | 1/2006 | Henseler | G06F 9/50 |
| 2007/0162620 | A1 | * | 7/2007 | Terry | H04L 12/10 709/253 |
| 2007/0237322 | A1 | * | 10/2007 | Hussain | H04L 12/40045 379/413 |
| 2008/0005433 | A1 | * | 1/2008 | Diab | G06F 13/4072 710/106 |
| 2008/0005602 | A1 | * | 1/2008 | Diab | G06F 1/266 713/300 |
| 2008/0080105 | A1 | * | 4/2008 | Blaha | H04L 12/10 361/38 |
| 2008/0107109 | A1 | * | 5/2008 | Michaud | H04L 12/12 370/390 |
| 2008/0256371 | A1 | * | 10/2008 | Diab | H04L 12/10 713/300 |
| 2010/0023785 | A1 | * | 1/2010 | Diab | H04L 12/10 713/310 |
| 2011/0145533 | A1 | * | 6/2011 | Raisch | G06F 13/4027 711/165 |
| 2011/0217873 | A1 | * | 9/2011 | Diab | H01R 13/66 439/620.01 |
| 2011/0225323 | A1 | * | 9/2011 | Duron | G06F 13/385 710/8 |
| 2011/0282963 | A1 | * | 11/2011 | Shimahara | G06F 3/061 709/217 |
| 2013/0073760 | A1 | | 3/2013 | Wiesgickl | |
| 2013/0254487 | A1 | * | 9/2013 | Tanaka | H04L 49/552 711/123 |
| 2013/0328528 | A1 | * | 12/2013 | Takata | H04B 3/54 320/109 |

OTHER PUBLICATIONS

PCT Search Report and Written Opinion issued in co-pending International Application No. PCT/EP2013/064887, 12 pages, dated Oct. 1, 2013.

Kriesel W. et al., "Asi Im Ueberblick", Aktuator Sensor Interface Fuer Die Automation, XX, XX, Jan. 1, 1994, XP002062938, 50 pages.

* cited by examiner

INTELLIGENT CONNECTOR AND BUS CONTROLLER

CROSS-REFERENCE TO RELATED APPLICATIONS

This application is a continuation of PCT International Application No. PCT/EP2013/064887 filed Jul. 15, 2013, which claims priority under 35 U.S.C. § 119 to Chinese Patent Application No.: 201210246232.6, filed Jul. 16, 2012

FIELD OF THE INVENTION

The invention is generally related to intelligent electrical connectors, and more specifically, to an intelligent electrical connector used in electrical appliances.

BACKGROUND

With the development of electronic technologies, an increasing number of electrical appliances have been integrated with different hardware modules for implementing various physical functions. For example, hardware modules such as electric heaters, fans, motors, and various kinds of sensors, etc., are commonly integrated into household appliances. To control the operations of these hardware modules, a master control board of the electrical appliance has to be connected with each of the hardware modules. The master control board supplies power to each of these hardware modules or to enables signal communication between the master control board and the different hardware modules. In addition, the switches or relays for controlling the power supplied to the hardware modules are commonly integrated on the master control board.

However, for traditional electrical appliances, the implementation of the electrical connections between the master control board and the hardware modules requires each of the respective hardware modules to connect to the master control board separately through wires. This leads to a large number of interfaces on the master control board, and hence a large number of wires lead out from these respective interfaces. This type of control circuit structure has a complicated structure, a low scalability and its maintenance costs are high.

There is a need for a device having a relatively simple structure for coupling the main control module with the slave modules in the electrical appliance.

SUMMARY

An intelligent connector has a signal processing unit, a first port, and a second port. The signal processing unit communicates signals between a bus and a slave module. The first port is coupled between the bus and the signal processing unit, and is connected to a power supply line. The second port is coupled between the signal processing unit and the slave module, and is positioned to provide a power supply to the slave module.

BRIEF DESCRIPTION OF THE DRAWINGS

The invention will now be described by way of example, with reference to the accompanying Figures, of which.

DETAILED DESCRIPTION OF THE PREFERRED EMBODIMENT(S)

Figure 1:
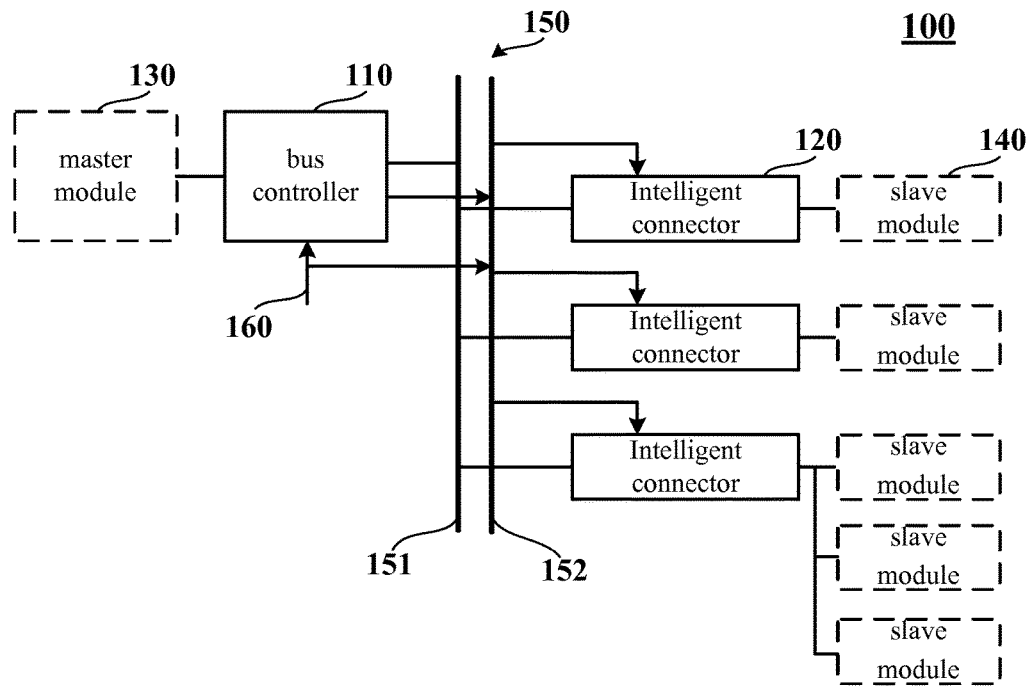
FIG. 1 is a diagram of a control circuit having a bus controller and an intelligent connector.

FIG. 1 illustrates a control circuit 100 having a bus controller 110 and an intelligent connector 120. The control circuit 100 is positioned in an electrical appliance (not shown) for coupling a master control module 130 with at least one slave module 140 in the electrical appliance, so as to realize signal communication or exchange between the master control module 130 and the slave module 140.

The electrical appliance may be, for example, home appliances, industrial equipment, numerical control (NC) machine tools, etc. In the electrical appliance, the master control module 130 refers to the module for controlling the operation of the slave modules 140. Based on user input or instructions generated by an application program, the master control module 130 generates control signals for controlling the operation of the slave modules 140.

The slave modules 140 may include, for example, microcontroller units, micro-processors or other suitable electronic devices. Slave module 140 refers to an electronic or an electro-mechanical module that is connected to the master control module 130 through the control circuit 100. The operation of the slave modules 140 may be controlled by the control signals provided by the master control module 130. The master control module 130 may be, for example, a heater, radiator, actuator, etc.

In other embodiments, the slave module 140 may be a sensor that can also generate feedback signals. Generally, the operation of the slave module 140 can be maintained by the power supply loaded thereon, and the slave module 140 operation status can be changed according to the type of power supply, such as a change in power, current or voltage.

One of ordinary skill in the art would appreciate that the number of the slave modules 140 shown in FIG. 1 is exemplary, and that the number of the slave modules 140 in the electronic appliance is not limited to three, but can be one, two, or four or more. In an embodiment, one intelligent connector 120 can also correspond to two or more slave modules 140.

In an embodiment of FIG. 1, the control circuit 100 has a bus construction, in which a bus 150 connects the intelligent connector 120 with the bus controller 110 for transmitting data signals.

In an embodiment, a control signal from the master control module 130 can be transmitted to the intelligent connector 120 through bus 150, and can be further transmitted to the corresponding slave modules 140 through the intelligent connector 120. In an embodiment, a feedback signal from the slave modules 140 can be transmitted to the bus controller 110 through bus 150, and can be further transmitted to the master control module 130 through bus controller 110.

The intelligent connector 120 may also connect to a power line 160 to receive a power supply, and in turn, provide power to the slave modules 140. In an embodiment of FIG. 1, the power line 160 is connected to the intelligent connector 120 through bus 150, wherein the bus 150 includes a signal bus 151 for transmitting signals, and a power bus 152 for delivering power. The power bus 152 can either obtain the power supply by indirectly coupling to the power line 160 through the bus controller 110, or by directly coupling to the power line 160 on the electrical appliances. 5 In an embodiment, the connection between the power bus 152 and the power line 160 can be through either of the aforementioned two coupling methods; or by through a combination of both of these two methods, as shown in an embodiment of FIG. 1. In another embodiment, the power line 160 can be directly coupled to the intelligent connector 120, bypassing the bus 150, and power can be provided to the corresponding slave modules 140 through the intelligent connector 120.

Figure 2:
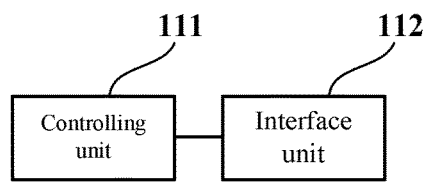
FIG. 2 is a diagram of the bus controller in FIG. 1.
Figure 3:
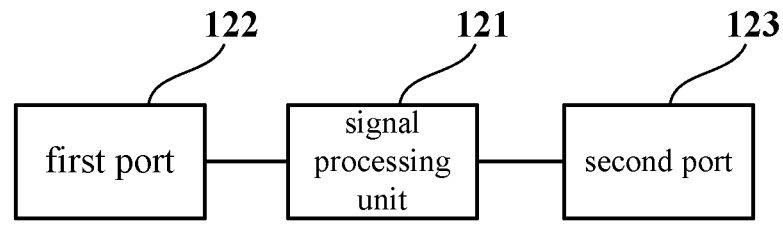
FIG. 3 is a diagram of the intelligent connector in FIG. 1.

FIGS. 2 and 3 respectively illustrate embodiments of the bus controller 110 and the intelligent connector 120. Next, with reference to FIGS. 1-3, the bus controller 110 and the intelligent connector 120 are described in further detail.

In the embodiments of FIGS. 1 and 2, the bus controller 110 is positioned for coupling the bus 150 with the master control module 130, wherein the bus controller 110 includes: a control unit 111 for communicating signals between the bus 150 and the master control module 130, the control unit 111 is positioned to add a destination address to the control signal from the master control module 130, wherein the destination address indicates an address of the intelligent connector 120 coupled to the bus 150 corresponding to the control signal.

By using a destination address in the control signal, the control signal from the bus controller 110 to the bus 150 can be recognized by the corresponding intelligent connector 120, which consequently, allows the intelligent connector 120 to control the corresponding actions of the slave modules 140 with which it is coupled. The control unit 111 can also deliver other signals from the master control module 130 to the bus 150.

In an embodiment, the bus controller 110 further includes an interface unit 112 positioned to match the signal transmission such as signal timing, signal level, signal format, etc. between the control unit 111 and the bus 150. In an embodiment, the bus controller 110 is coupled to the bus 151, 152 through an RS-485 bus interface or LIN (Local Interconnect Network) bus interface, and the bus controller 110 transmits signal according to the corresponding bus protocol specification. One of ordinary skill in the art would appreciate that that the bus controller 110 can also use other suitable bus interfaces and corresponding bus protocol specifications to communicate signals with bus 151, 152.

One of ordinary skill in the art would appreciate that, the bus controller 110 can be a single hardware module, and can be coupled to the master control module 130. This implementation method has good compatibility and can be seamlessly integrated with the master control module 130. In an alternative embodiment, the bus controller 110 can be integrated in the master control module 130 in a firmware or software format. Hardware with such implementation is relatively low cost, and can be realized only by updating the software or firmware code in the master control module 130.

In the embodiments of FIGS. 1 and 3, the intelligent connector 120 is positioned to couple the bus 150 and at least one slave module 140, wherein the intelligent connector 120 includes: a signal processing unit 121 for communicating signals between the bus 150 and the slave module 140 and for processing the communicating signals, and for responding to a control signal with a corresponding address from the bus 150 upon receiving such a control signal; a first port 122 coupled between bus 150 and the signal processing unit 121 for transmitting signals between them, the first port 122 also being coupled to a power line 160 for receiving power supply; and a second port 123 coupled between the signal processing unit 121 and the slave module 140 for transmitting signals between them, the second port also providing the slave module 140 with a power supply.

The different intelligent connectors 120 coupled to the bus 150 have different addresses, so that the different intelligent connectors 120 can be distinguished from each other and can be recognized by the bus controller 110. In an electrical appliance installed with a control circuit 100, when the master control module 130 controls the slave modules 140, the bus controller 110 first receives the control signals provided by the master control module 130. Then, the bus controller 110 packs the control signals as data packets, and adds the destination address to the control signals. Next, the bus controller 110 sends the packed control signals to bus 150, and distributes the control signals through the bus 150 to each intelligent connector 120 coupled with the bus 150. Upon receiving the packed control signals and the destination address, the signal processing unit 121 in each intelligent connector 120 will check and determine whether the destination address corresponds to its own address: if the destination address matches the address of the intelligent connector 120, the signal processing unit 121 unpacks the data packet to acquire the control signals; if the destination address does not match the address of signal processing unit 121, the data packet will be discarded. Then, signal processing unit 121 responds to the control signals acquired, and operates according to the different instructions in the control signals.

The signal processing unit 121 may comprise a filtering sub-unit, a signal amplifying sub-unit, a D/A converter sub-unit, a A/D convertor sub-unit, and/or a modulation/demodulation sub-unit. These sub-units can perform corresponding signal processing to the signals communicated with the intelligent connector 120.

Since a signal processing unit 121 is disposed in the intelligent connector 120, the intelligent connector 120 can transmit signals and provide power supply between the bus 150 and the slave modules 140, and can also respond to and process the control signals from the bus 150. This allows the slave modules 140 to which the intelligent connector 120 is connected, especially a machine or appliance module such as heater, motor, valve, etc., to have signal processing capability. Consequently, the controllability and efficiency of the overall operation of the electrical appliance is improved As discussed above, the control unit 111 in the bus controller 110 is used for communicating signals between the bus 150 and the master control module 130. Accordingly, the signal processing unit 121 in the intelligent controller 120 is positioned to communicate signals between the bus 150 and the slave modules 140. In this way, through the bus 150, bus controller 110 and intelligent controller 120, a two-way communication can be carried out between the master control module 130 and the slave modules 140.

The slave module 140 may be a sensor that can generate sensing data. The sensed data can reflect the operating status of the electrical appliance. For example, the slave module 140 may be a temperature sensor which detects temperature variations within the electrical appliance, and generates a feedback signal in response to the temperature variations. In other examples, the operation state of the slave module 140 may change in accordance with the change in operation status of the electrical appliance. In an embodiment, when the slave module is a radiator such as a fan, the thermal dissipation efficiency of the radiator may change as the local temperature or global temperature in the electrical appliance changes.

In an embodiment, the feedback signal may also be a response by the slave module 140 to the control signal provided by the master control module 130. Thus, the intelligent connector 120 can receive feedback signals from the slave modules 140. The feedback signal contains the sensing data reflecting the operation state of the electrical appliance, or other signals from the slave module 140. Then, the intelligent connector 120 receives the feedback signals. Optionally, the intelligent connector 120 may add an address in the feedback signals for instructing the slave module 140 that is positioned to transmit those feedback signals. Then, the slave module 140 transmits the feedback signals to the bus controller 110 through the bus 150. Next, the bus controller 110 decodes the encapsulated feedback signals and provides the feedback signals to the master control module 130. In this way, the master control module 130 may determine the operation status of each slave modules 140 in the electrical appliance, and further centralizes the management and control of these slave modules 140

In an embodiment of FIG. 1, the bus 150 includes a signal bus 151 and a power bus 152. Accordingly, a first port 122 of the intelligent connector 120 connects the two buses 151, 152, so as to match the intelligent connector 120 signal transmission such as signal timing, signal level, signal format, etc. with the bus 151, 152. In an embodiment, the first port 122 of the intelligent connector 120 can be a RS-485 bus interface or LIN bus interface which transmits signals according to the corresponding bus protocol specification. Accordingly, the bus controller 110 can also be coupled to the bus 150 by a RS-485 bus interface or a LIN bus interface. One of ordinary skill in the art would appreciate that the intelligent connector 120 and the bus controller 110 can communicate signals with the bus 151, 152 by using other suitable bus interfaces and corresponding bus protocol specifications.

A second port 123 may be positioned to couple the intelligent connector 120 with the slave module 140. The second port 123 can be coupled to the slave module 140 through direct contact, i.e. achieving transmission of signal and power supply through conductive leads or conductive contact stripes that require direct contact. Alternatively, the second port 123 may be coupled to the slave module 140 without contact, achieving transmission of signal and power supply through electromagnetic field, light waves, ultrasonic waves or other media.

In an embodiment, the intelligent connector 120 includes one or more extended interfaces positioned to connect the extended sub-unit. The extended interfaces support devices such as input devices, display devices or other extended sub-units that is suitable for coupling to the intelligent connector 120. Extended interfaces such as UART (Universal Asynchronous Receiver/Transmitter), I2C (Inter-Integrated Circuit), SPI (Serial Peripheral Interface) or other interfaces may be used.

In an embodiment of FIG. 3, the first port 122 of the intelligent connector 120 is coupled to the power line 160 by the bus 150 in order to receive power supply provided by the power line 160. The first port 122 and the second port 123 are in direct electric contact, such that the power supply received can be supplied to the slave modules 140 by the second port 123.

Figure 4:
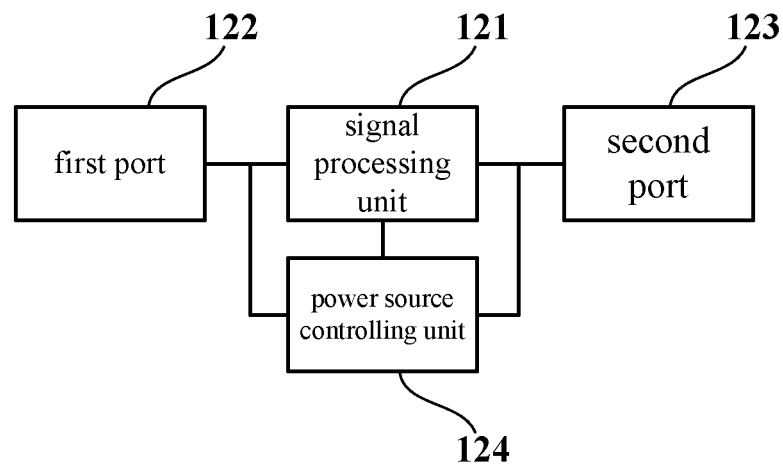
FIG. 4 is a diagram of the intelligent connector in FIG. 1.

In an embodiment of FIG. 4, the intelligent connector 120 includes a power source control unit 124 for controlling the power supply. The power source control unit 124 is positioned between the first port 122 and the second port 123, and is further coupled to the signal processing unit 121, which switches the connection of the slave modules 140 and the power line 160, in order to control the power supplied to the slave modules 140.

The intelligent connector 120 may include circuit control elements, such as controllable switches, relays, and the like. The controllable switch or relay is positioned in the electrical pathway from the power line 160 to the slave module 140, and changes the power supplied to the slave module 140 based on status of the circuit control elements.

In an embodiment, the power supply provided by the power line 160 is alternating current. Accordingly, the power source control unit 124 may further include an AC-DC converting sub-unit for converting the power supply provided by the power line 160 from alternating current (AC) to direct current, and provides all the converted power supply to the slave modules 140 and/or the signal processing unit 121. In another embodiment, the power supply provided by the power line 160 is a direct current (DC). The power source control unit 124 may further comprise a DC-AC converting sub-unit for converting voltage supplied of the direct current provided by the power line 160, and providing all the converted voltage to the slave modules 140 and/or signal processing unit 121.

Consequently, the power source control unit 124 in the intelligent connector 120 is closer to the slave modules 140, and its connection with the slave modules 140 is less complicated than conventional designs, thus effectively reducing the number of the wires in the electrical appliance.

Figure 5:
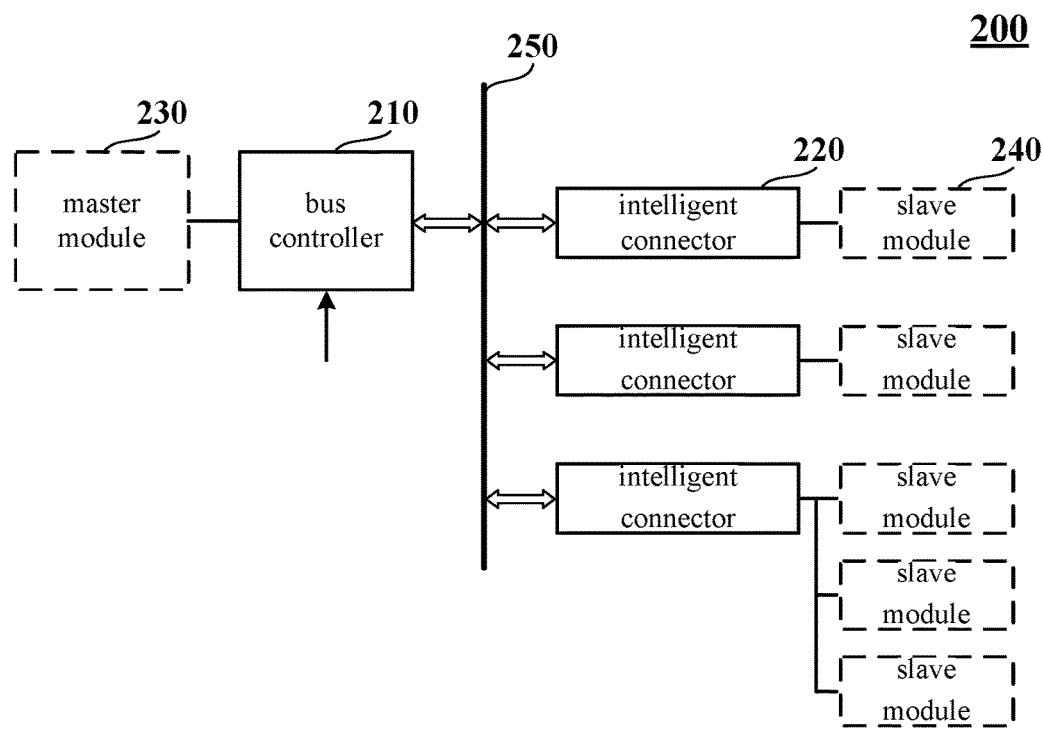
FIG. 5 is a diagram of a control circuit having a bus controller and an intelligent connector.

In an embodiment of FIG. 5, the control circuit 200 includes a bus 250 in a circuit that transmits signals through a power line. The bus 250 may be a power line carrier communications circuit or a DC power line communications bus. In an embodiment, the signal bus 151 and the power bus 152 shown in FIG. 1 are combined into a single circuit. The control circuit 200 eliminates the need to use additional signal circuits for transmitting data signals, which effectively reduces the number of the wires in the electrical appliance. In addition, since the control circuit 200 utilizes a single circuit for transmitting data signal and power supply between the master control module 230 and the slave module 240, there is no need for the master control module 230 to have a plurality of separate interfaces for connecting with each of the slave modules 240. This further reduces the number of the wires and reduces the complexity of the control circuit module 200.

For collecting data signals from the bus 250, bus controller 210 and intelligent connector 220 that are coupled to the bus 250, an integrated unit is included to modulate and/or demodulate signals. This modulation/demodulation (modem) unit can convert the signals provided by the master control module 230 and/or signals provided by the slave modules 240 into a format operable for power line transmission so as to allow the data signals and the power supply to be transmitted through the same bus 250.

Figure 6:
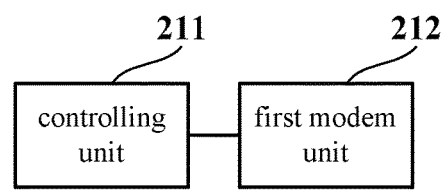
FIG. 6 is a diagram of the bus controller in FIG. 5.
Figure 7:
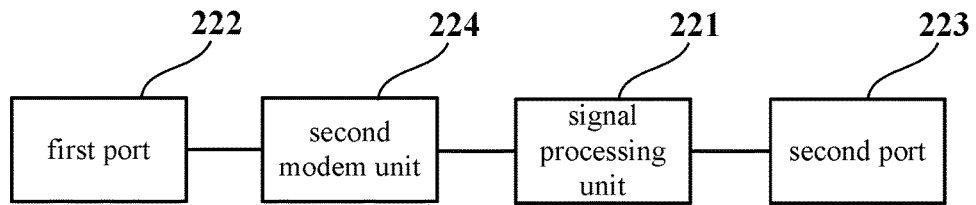
FIG. 7 is a diagram of the intelligent connector in FIG. 5.

FIGS. 6 and 7 respectively illustrate exemplary embodiments of the bus controller 210 and the intelligent connector 220. The bus controller 210 and the intelligent connector 220 are adapted for the case in which bus 250 is a DC power source line communication bus, wherein the power supply transmitted by the bus 250 is a direct current, and the signal is modulated in the direct current.

In an embodiment of FIG. 6, the bus controller 210 includes a control unit 211 and a first modem unit 212, wherein the first modem unit 212 is coupled between the control unit 211 and the bus 250 for modulating and/or demodulating the control signals from the master control module 230 and/or the feedback signals from the bus. The first modem unit 212 allows both the signal and the power supply to be transmitted through same bus 250. In an embodiment, the bus controller 210 can be coupled to the bus 250 through PSI5 (Peripheral Sensor Interface 5).

In an embodiment of FIG. 7, the intelligent connector 220 includes a signal processing unit 221, a first port 222, a second port 223 and a second modem unit 224. The second modem unit 224 is coupled between the signal processing unit 221 and the first port 222 and is positioned to modulate and/or demodulate the control signals from the bus 250 and/or the feedback signals from the slave modules 240. In an embodiment, the first port 222 is a PSI5 bus interface.

Figure 8:
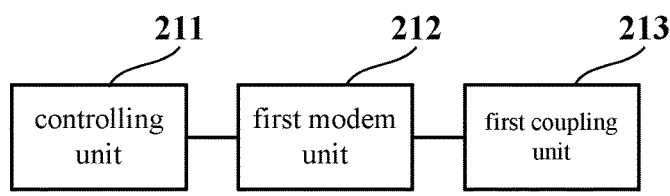
FIG. 8 is a diagram of the bus controller in FIG. 5.
Figure 9:
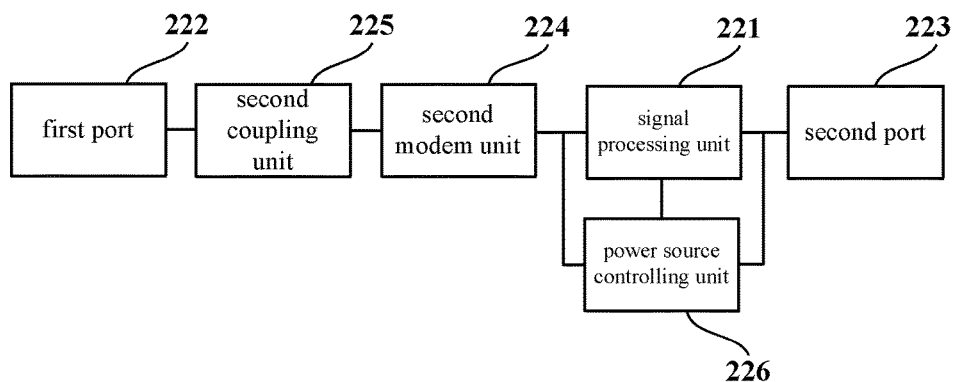
FIG. 9 is a diagram of the intelligent connector in FIG. 5.

FIGS. 8 and 9 respectively illustrate exemplary embodiments of the bus controller 210 and the intelligent connector as shown in FIG. 5. The bus controller 210 and the intelligent connector are designed for the bus 250 being a power line carrier communication line, such as when the power supply transmitted by the bus 250 is an alternating current, and the signal is modulated in the alternating current (AC).

In an embodiment of FIG. 8, the bus controller 210 includes a control unit 211, a first modem unit 212 and a first coupling unit 213. The first modem unit 212 and the first coupling unit 213 are connected in series between the control unit 211 and bus 250. The first modem unit 212 is positioned to modulate and/or demodulate signals. The first coupling unit 213 is coupled with the first modem unit 212 for communication of the modulated signals between the first modem unit 212 and the bus 250.

In an embodiment of FIG. 9, the intelligent connector 220 includes a signal processing unit 221, a first port 222, a second port 223, a second modem unit 224 and a second coupling unit 225. The second modem unit 224 is coupled to the signal processing unit 221 for signal modulation and/or demodulation. The second coupling unit 225 is coupled between the second modem unit 224 and the first port 222 for communication of the modulated signals between the second modem unit 224 and the bus 250.

The first modem unit 212 and the second modem unit 224 as shown in FIGS. 6 to 9, perform signal modulation and/or demodulation by using carrier modulation technology, such as Orthogonal Frequency Division Multiplexing. One of ordinary skill in the art would appreciate that, in an embodiment, the slave module 240 may not feed signals back to the master control module 230. Accordingly, the first modem unit 212 includes a modulator for modulating the control signal, and the second modem unit 224 includes a demodulator for demodulating the modulated control signal. In another embodiment, the slave module 240 feeds signals back to the master control module 230. Accordingly, the second modem unit 212 may further comprise a modulator for modulating the feedback signals, and the first modem unit 224 may further include a demodulator for demodulating the modulated feedback signal.

In FIGS. 8 and 9, the signal coupling of the bus 250 with the first coupling unit 213 and the second coupling unit 225 can be achieved through a capacitive coupling circuit or inductive coupling circuit structure.

Figure 10:
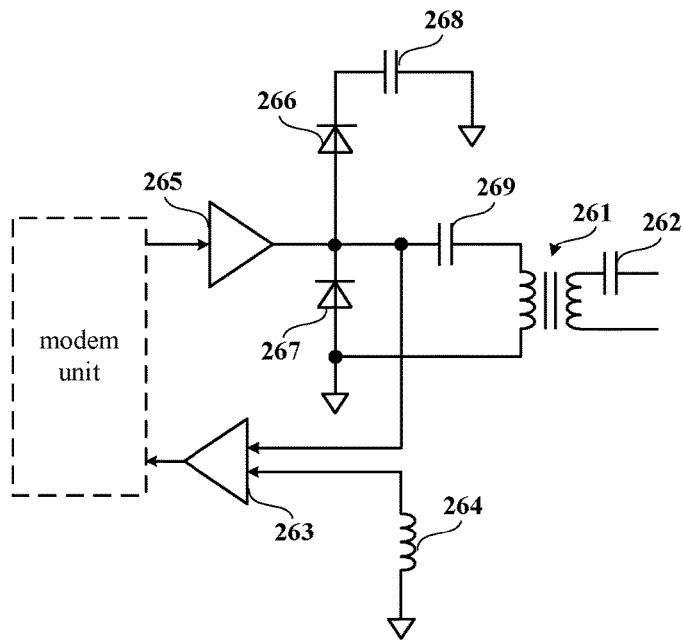
FIG. 10 is a circuit diagram of a first coupling unit and a second coupling unit.

In the embodiment of FIG. 10, the coupling unit is coupled to the bus 250 through transformer 261 and coupling capacitor 262. The transformer 261 may isolate the voltage with large amplitude on the bus 250 from other parts of the coupling unit. The coupling capacitor 262 and the secondary coil of the transformer 261 form a high-pass filter for filtering and eliminating the interference of the frequency of the AC (50 or 60 Hz) from the bus 250. The secondary coil of the transformer 261 is coupled to an input of a first operational amplifier 263, and the other input of the operational amplifier 263 is coupled to the reference inductance 264. When signal is received from the bus 250, the operational amplifier 263 amplifies the signal difference between its two inputs and outputs the signal difference to the corresponding modem unit.

In an embodiment, the coupling unit further includes a second operational amplifier 265. An input of the second operational amplifier 265 receives the modulated control signal and an output of the second operational amplifier 265 is coupled to the primary coil of the transformer 261 through a coupling capacitor 269 so as to provide control signals to the bus 250 through the transformer 261. The output of the second operational amplifier 265 is further coupled with clamping diodes 266, 267 in series. Clamping diodes 266, 267 are positioned to provide surge protection, to protect the second operational amplifier 265 from being damaged by an instantaneous high-voltage pulse. One end of the clamping diodes 266 is coupled to the reference electric potential through a shunt capacitor 268.

While the coupling unit shown in FIG. 10 only illustrates an exemplary circuit structure for the first coupling unit 213 and the second coupling unit 225, the first coupling unit 213 and the second coupling unit 225 can have other circuit structures so as to couple the modem unit with the bus.

In some electrical appliance, different slave modules may require power supply with different magnitudes of voltage. For example, the voltage of the power required by modules with smaller rated working power, such as sensors, may be far smaller than that required by modules with higher rated working power, such as radiators or heaters. In this case, the bus 250 may comprise multiple bus branches wherein each bus branch may provide power with different magnitudes of voltage. These bus branches can be respectively coupled to different intelligent connector 220 and to the same bus controller 210.

Each intelligent connector 220 in the control circuit 200 is further coupled between a slave module 240 and a bus branch. Thus, the intelligent connector 220 can still utilize the intelligent connector structure as shown in FIG. 10. However, as the bus controller 210 needs to be coupled with multiple bus branches, its structure may differ from the bus controller structure as shown in FIG. 9.

Figure 11:
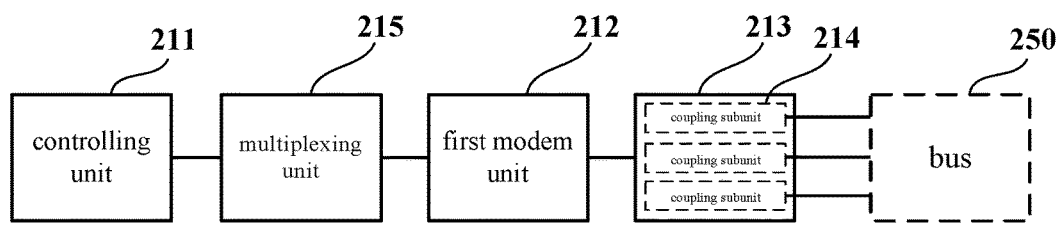
FIG. 11 is a diagram of the bus controller in FIG. 5.

In an embodiment of FIG. 11, the bus controller 210 includes a control unit 211, a first modem unit 212 and a first coupling unit 213. The first coupling unit 213 includes multiple coupling sub-units 214. Each of the coupling sub-unit 214 is coupled to a bus branch, so as to communicate with, and supply power to, the intelligent connector 120 coupled to the bus branch through the bus branch.

In addition, the bus controller 210 further includes a multiplexing unit 215 having multiple data signal channels. The multiplexing unit 215 is coupled between the control unit 211 and the first modem unit 212 for selecting one of the multiple data signal channels for communicating signals between the first modem unit 212 and the control unit 211. Thereby communication between the slave modules coupled to the different bus branches and the master control module is facilitated. In an embodiment, the multiplexing unit 215 may receive a selection signal from the master control module for switching the data signal channel.

As the multiplexing unit 215 is positioned to switch the data signal channel, only one modem unit 212 is required for the bus controller. This modem unit 212 is shared by the multiple coupling sub-units 214 in the first coupling unit 213. This can reduce the use of modem units in the bus controller 210 and hence reduces hardware costs.

In an embodiment, each coupling sub-unit 214 in the first coupling unit 213 may contain a primary coil and a secondary coil. Each of the secondary coils of the coupling sub-units is respectively coupled to a bus branch through a coupling capacitor. In another embodiment, the first coupling unit 213 may contain a secondary coil, and each of the coupling sub-units 214 contains a secondary coil, and the multiple coupling sub-units 214 share the primary coil. Each secondary coil is respectively coupled to a bus branch through a coupling capacitor. Such a coupling unit further reduces the use of coil and hence further reduces hardware costs.

Although the present invention has been described in considerable detail with reference to the figures and the above description, such illustration and description are descriptive and exemplary and is not intended to be limiting. The present invention is not limited to above embodiments. By studying the specification, the detailed descriptions, drawings and the appended claims, one of ordinary skill in the art would readily understand and would be able to implement other embodiments of the present invention. One of ordinary skill in the art would also appreciate that the above-described exemplary embodiments are not intended to illustrate all possible embodiments. It should be noted that the present invention may have other embodiments or may be structurally or logically modified without deviating from the scope of the present invention.

In the claims, the term "comprising" is not intended to exclude other elements and steps, and the term "one" is not intended to exclude in the possibility of plurality. In the practical application of the present invention, one element can carry out the functions of several technical features in the claims. Any reference sign of drawings in the claims should not be interpreted as limitation to the scope of the present invention.

What we claimed is:

1. A control circuit, comprising:
   a master control module;
   a bus;
   a bus controller coupling the bus with the master control module;
   a plurality of slave modules including a plurality of subsets of slave modules, the slave modules within each subset performing a same operation; and
   a plurality of intelligent connectors, a number of intelligent connectors equal to a number of subsets of slave modules, each intelligent connector having
      a signal processing unit for communicating signals between the bus and one subset of the plurality of slave modules;
      a first port coupled between the bus and the signal processing unit, and being connected to a power supply; and
      a second port coupled between the signal processing unit and the subset of the plurality of slave modules, and being positioned to provide power to the subset of the plurality of slave modules.

2. The control circuit of claim 1, wherein the signal processing unit includes
   a filtering sub-unit;
   a signal amplifying sub-unit;
   a digital/analog converting sub-unit;
   an analog/digital converting sub-unit; or
   a modulating/demodulating sub-unit; or any combination thereof.

3. The control circuit of claim 1, wherein each intelligent connector further comprises:
   a power control unit coupled between the first port and the second port, and being coupled to the signal processing unit for switching connection of the subset of the plurality of slave modules with the power supply under a control of the signal processing unit.

4. The control circuit of claim 3, wherein the power control unit includes a relay or a controllable switch.

5. The control circuit of claim 3, wherein the power control unit further comprises an AC-DC converter sub-unit.

6. The control circuit of claim 3, wherein the power control unit further comprises a DC-AC converter sub-unit.

7. The control circuit of claim 1, wherein the bus is a power line carrier communication circuit.

8. The control circuit of claim 7, wherein each intelligent connector further comprises:
   a modem unit coupled to the signal processing unit for signal modulation and/or demodulation; and
   a coupling unit coupled between the modem unit and the first port for communicating the modulated signals between the modem unit and the bus.

9. The control circuit of claim 1, wherein the bus is a DC power line communication bus.

10. The control circuit of claim 9, wherein each intelligent connector further comprises a modem unit coupled between the signal processing unit and the first port for signal modulation and/or demodulation.

11. The control circuit in accordance with claim 9, wherein the first port is a PSI5 bus port.

12. The control circuit of claim 1, wherein the first port is a RS-485 bus port or a LIN bus port.

13. The control circuit of claim 1, wherein the second port is coupled to the subset of the plurality of slave modules through direct contact or indirect contact.

14. The control circuit of claim 1, wherein each intelligent connector further comprises an extended interface for coupling an extended unit to the signal processing unit.

15. The control circuit of claim 1, wherein the bus controller has a control unit for communicating signals between the bus and the master control module, and is connected to add a destination address to a control signal from the master control module.

16. The control circuit of claim 15, wherein the destination address is an address of one of the plurality of intelligent connectors coupled to the bus corresponding to the control signal.

17. The control circuit of claim 16, wherein the bus controller further comprises:
   a first modem unit for signal modulation and/or demodulation; and
   a first coupling unit coupled to the first modem unit for communicating the modulated signal between the first modem unit and the bus.

18. The control circuit of claim 17, wherein
   the bus comprises multiple bus branches;
   the first coupling unit further comprising multiple coupling sub-units, each sub-unit being coupled to one of the multiple bus branches; and
   the bus controller further comprises a multiplexing unit having multiple data signal channels and being positioned to select a data signal channel from the multiple data signal channels for communicating signals between the first modem unit and the control unit.

19. The control circuit of claim 18, wherein each coupling sub-unit includes:
   a primary coil; and
   a secondary coil coupled to one bus branch through a coupling capacitor.

20. The control circuit of claim 18, wherein
   the first coupling unit includes a primary coil,
   each coupling sub-unit includes a secondary coil coupled to a bus branch through a coupling capacitor; and
   each coupling sub-unit shares the primary coil.

21. The control circuit of claim 15, wherein the bus controller couples to the bus through a RS-485 bus interface, a LIN bus interface or a PSI5 bus interface.

22. A control circuit, comprising:
   a master control module;
   a bus;
   a bus controller coupling the bus with the master control module;
   a plurality of slave modules including a plurality of subsets of slave modules, the slave modules within each subset performing a same operation; and
   a plurality of intelligent connectors, a number of intelligent connectors equal to a number of subsets of slave modules, each intelligent connector having
      a signal processing unit for two-way communication between the bus and one subset of the plurality of slave modules;
      a first port coupled between the bus and the signal processing unit, and being connected to a power supply; and
      a second port coupled between the signal processing unit and the subset of the plurality of slave modules, and being positioned to provide power to the subset of the plurality of slave modules.

* * * * *